United States Patent [19]
Mihara

[11] Patent Number: 5,168,402
[45] Date of Patent: Dec. 1, 1992

[54] VARI-FOCAL LENS SYSTEM

[75] Inventor: Shinichi Mihara, Tokyo, Japan

[73] Assignee: Olympus Optical Co., Ltd., Tokyo, Japan

[21] Appl. No.: 712,077

[22] Filed: Jun. 7, 1991

[30] Foreign Application Priority Data

Jun. 8, 1990 [JP] Japan .................. 2-148599

[51] Int. Cl.$^5$ .............................. G02B 15/14
[52] U.S. Cl. ..................... 359/684; 359/687; 359/693
[58] Field of Search ............... 350/423, 427; 359/684, 359/687, 693

[56] References Cited

U.S. PATENT DOCUMENTS 4,690,513 9/1987 Takahashi et al. .................. 350/427
5,009,492 4/1991 Hamano .............................. 350/427

FOREIGN PATENT DOCUMENTS 62-178917 8/1987 Japan .
63-29718 2/1988 Japan .

Primary Examiner—Scott J. Sugarman
Attorney, Agent, or Firm—Cushman, Darby & Cushman

[57] ABSTRACT

A vari-focal lens system comprising, in the order from the object side, a first lens unit having a positive refractive power, a second lens unit having a negative refractive power, a third lens unit having a positive refractive power and a fourth lens unit; adapted to perform variation of focal length by moving the second lens unit and the third lens unit along the optical axis; and adapted to perform focusing by moving the second lens unit toward the object side.

4 Claims, 16 Drawing Sheets

WHEN FOCUSED ON AN OBJECT LOCATED AT A DISTANCE OF 1.0m AT THE WIDE POSITION

WHEN FOCUSED ON AN OBJECT LOCATED AT INFINITE DISTANCE AT THE WIDE POSITION

WHEN FOCUSED ON AN OBJECT LOCATED AT INFINITE DISTANCE AT THE TELE POSITION

WHEN FOCUSED ON AN OBJECT LOCATED AT A DISTANCE OF 1.0m AT THE TELE POSITION

FIG. 2
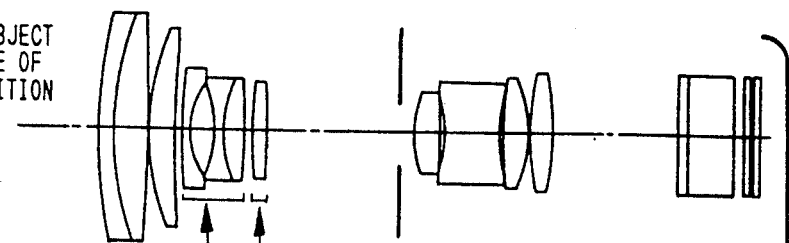
WHEN FOCUSED ON AN OBJECT LOCATED AT A DISTANCE OF 1.0m AT THE WIDE POSITION
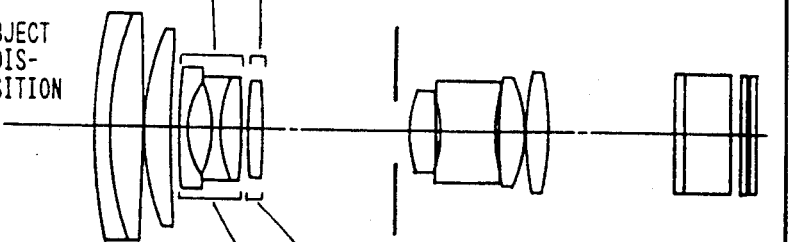
WHEN FOCUSED ON AN OBJECT LOCATED AT INFINITE DISTANCE AT THE WIDE POSITION
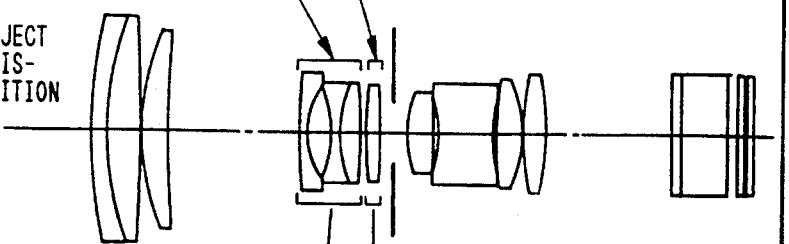
WHEN FOCUSED ON AN OBJECT LOCATED AT INFINITE DISTANCE AT THE TELE POSITION
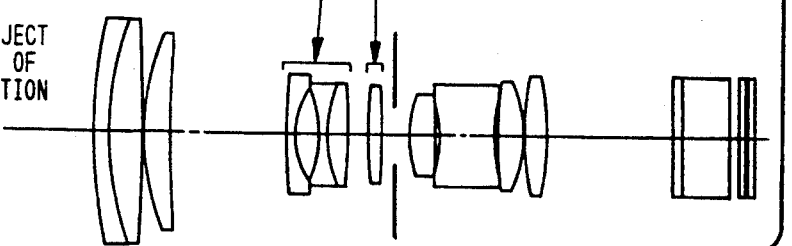
WHEN FOCUSED ON AN OBJECT LOCATED AT A DISTANCE OF 1.0m AT THE TELE POSITION FIG. 3
WHEN FOCUSED ON AN OBJECT
LOCATED AT A DISTANCE OF
1.0m AT THE WIDE POSITION
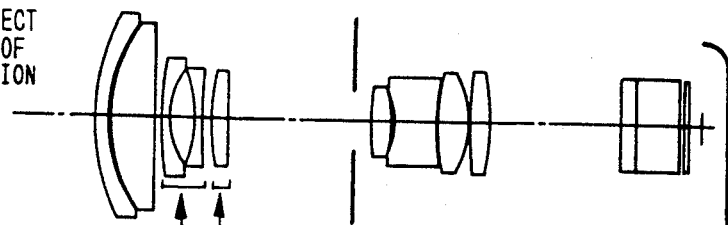
WHEN FOCUSED ON AN OBJECT
LOCATED AT INFINITE DIS-
TANCE AT THE WIDE POSITION
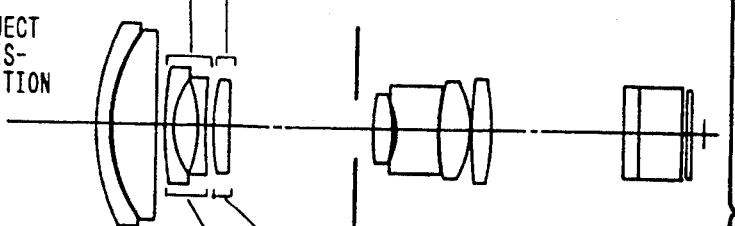
WHEN FOCUSED ON AN OBJECT
LOCATED AT INFINITE DIS-
TANCE AT THE TELE POSITION
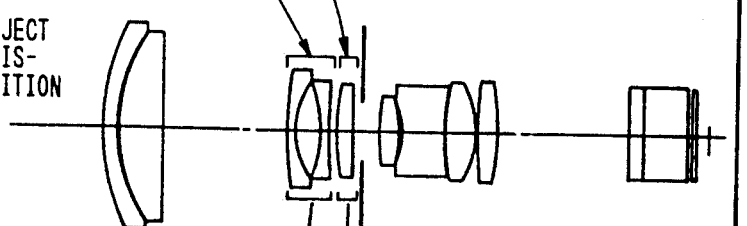
WHEN FOCUSED ON AN OBJECT
LOCATED AT A DISTANCE OF
1.0m AT THE TELE POSITION
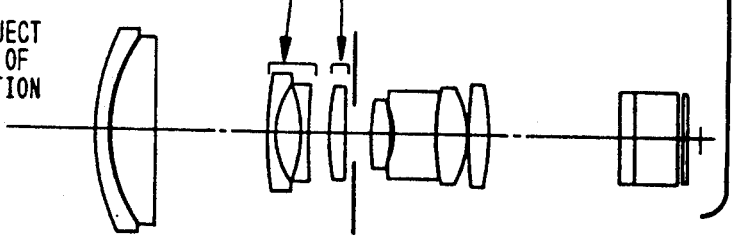

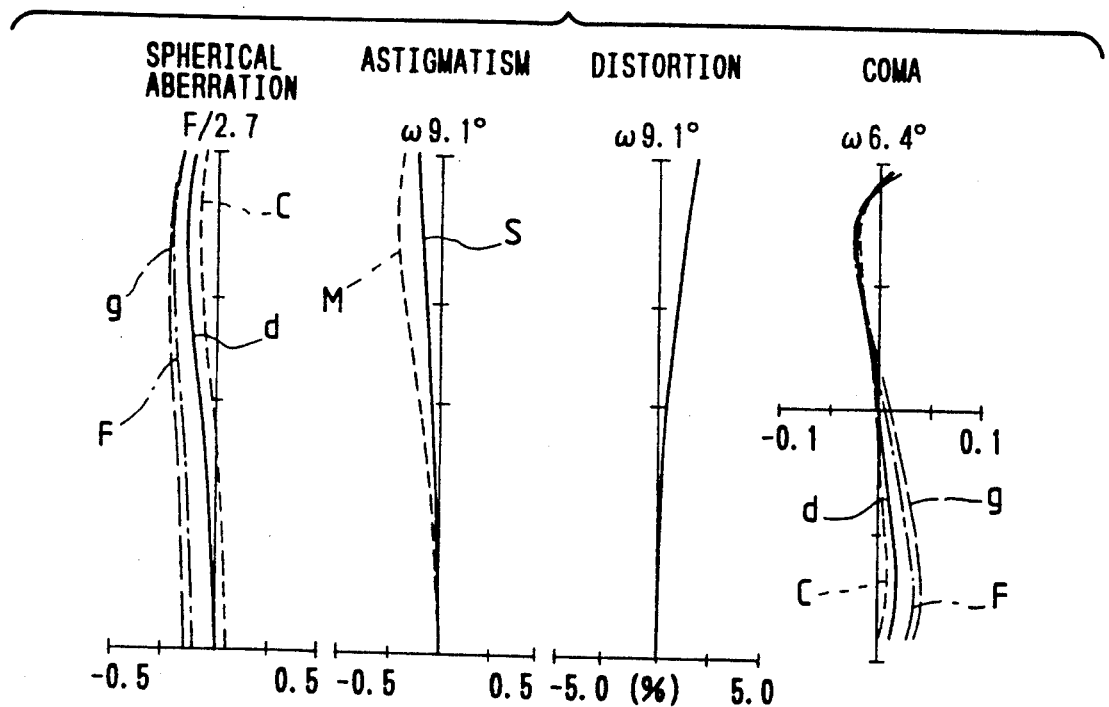
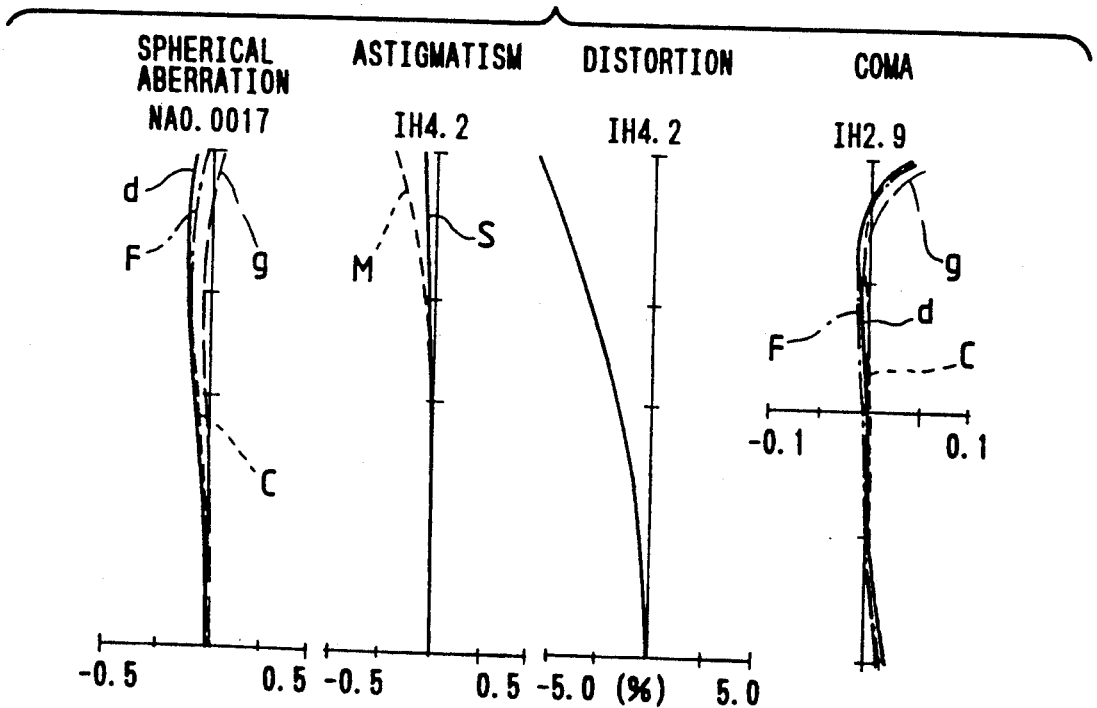

VARI-FOCAL LENS SYSTEM

BACKGROUND OF THE INVENTION a) Field of the Invention

The present invention relates to a vari-focal lens system which is to be focused by the rear focusing method or the inner focusing method.

b) Description of the Prior Art

The conventional zoom lens system is focused by moving the front lens unit along the optical axis. This is because the moving distance required for focusing varies along with variation of the focal length of the zoom lens system as a whole when the zoom lens system is focused by the inner focusing method or the rear focusing method, i.e., by moving a lens unit which is arranged on the image side of the lens unit having the vari-focal function in the zoom lens system. Accordingly, the zoom lens system which adopts the rear or inner focusing method does not allow graduation of the distances to objects to be brought into focus in correspondence to the moving distances of the focusing lens unit. Further, the conventional zoom lens system is defocused by changing focal length thereof after the zoom lens system is focused on an object located at a certain distance.

However, most of the still cameras and video cameras are equipped nowadays with autofocusing mechanisms. Therefore, the above-mentioned problem posed by adopting the rear focusing method or the inner focusing method can be corrected by using, as a focus detecting system, the so-called TTL type focusing system or the autofocusing system which is equipped with a focal length encoder for zoom lens systems, a ROM for storing lens system operating data, a calculating mechanism and a control mechanism.

Furthermore, the conventional zoom lens systems comprise a front lens unit which is generally large and heavy. Therefore, this lens unit is moved slowly for focusing, thereby slowing down focusing speed. In order to correct this problem, it is necessary to strengthen the power of the driving system though it results in a disadvantage of enhancing power consumption.

Accordingly, a merit is obtained for the autofocusing cameras by adopting the rear focusing method or the inner focusing method which performs focusing by moving a rear or intermediate lens unit which is small and light in weight. For this reason, there have been proposed numerous zoom lens systems which adopt the rear focusing method or have the compositions suited for the rear focusing method. From the mechanical viewpoint, however, it is desirable for a zoom lens system to have a composition as simple as possible.

As conventional examples of zoom lens systems each of which uses only two movable lens units for both the variation of focal length and focusing, there are known the lens systems disclosed by Japanese Patent Kokai Publication No. Sho 62-178917 and Japanese Patent Kokai Publication No. Sho 63-29718. Each of these conventional examples consists, in the order from the object side, of a first lens unit having a positive refractive power, a second lens unit which has a negative refractive power and a vari-focal function, a third lens unit having a positive refractive power, and a fourth lens unit which has a positive refractive power, and is moved for focusing and for correcting the variation of image point caused due to the variation of focal length.

Since the fourth lens unit of this conventional example has an imaging magnification lower than 1x, the zoom lens system is adapted so as to move the fourth lens unit toward the object side when the zoom lens system is to be focused on an object located at a short distance.

Moreover, a certain zoom lens system comprises a wide airspace between the third lens unit and the fourth lens unit. However, it is desired for such a zoom lens system to reduce the airspace as much as possible so as to meet the recent demand for compact design of the zoom lens system.

In addition, since the paraxial ray is high on the fourth lens unit, a zoom lens system which has a small F number or a large aperture is easily influenced in optical performance by eccentricity of lens element and can hardly be manufactured in practice. Especially, considering the fact that the image pickup devices which recently have small sizes impose strict manufacturing precision on lens elements, it is undesirable to select the rear focusing method or moving the fourth lens unit for focusing. The rear focusing method is still undesirable for the same reason even when the role of the fourth lens unit is allotted to the third lens unit.

SUMMARY OF THE INVENTION

A primary object of the present invention is to provide a vari-focal lens system which is to be focused by the rear focusing method or the inner focusing method, and is designed so as to reserve an airspace for moving lens units and have a composition allowing little influence on optical performance due to eccentricity of lens elements.

The vari-focal lens system according to the present invention comprises, in the order from the object side, a first lens unit having a positive refractive power, a second lens unit having a negative refractive power, a third lens unit having a positive refractive power and a fourth lens unit, and is adapted so as to perform zooming by moving the second lens unit and the third lens unit, said second lens unit satisfying the condition (1) mentioned below and moved toward the object side for focusing the vari-focal lens system.

$$|\beta_{IIT}| < 0.95 \tag{1}$$

wherein the reference symbol $\beta_{IIT}$ represents the magnification of the second lens unit when the vari-focal lens system is focused on an object located at an infinite distance.

The vari-focal lens system according to the present invention comprises the second lens unit and the third lens unit which are movable for variation of focal length as described above, and adopts the rear focusing method which moves the second lens unit, one of the lens units movable for focusing. Owing to this design, the airspace reserved for moving the movable lens units for variation of focal length can be utilized also for moving the second lens unit for focusing.

When the vari-focal lens system is designed so as to perform focusing by moving the second lens unit as described above, the moving distance of the second lens unit for focusing at the tele position is far longer than that at the wide position, or equal to the product of the moving distance at the wide position multiplied by the square of the vari-focal ratio.

However, the airspace reserved between the first lens unit and the second lens unit is widened as the vari-focal lens system as a whole acquires a longer focal length. Accordingly, no surplus airspace is necessary for focusing when the second lens unit is moved toward the object side (toward the first lens unit) for focusing the vari-focal lens system from an object located at an infinite distance onto another object located at a short distance. In order to focus the vari-focal lens system onto the object located at the short distance by moving the second lens unit toward the object side, it is sufficient to design the focusing lens unit so as to have a magnification lower than 1x.

Since the imaging magnification of the second lens unit is the highest at the tele position, it is sufficient for the purpose mentioned above to define the imaging magnification of the second lens unit to be set when the vari-focal lens system is focused on an object located at an infinite distance at the tele position thereof. For the reason described above, it is desirable to select the imaging magnification $\beta_{IIT}$ of the second lens unit so as to satisfy the condition (1).

If the imaging magnification $\beta_{IIT}$ has an absolute value larger than 0.95 and close to 1, the moving direction of the second lens unit (focusing lens unit) will be indefinite, and when the absolute value is far larger than 1, the second lens unit will be moved in the reverse direction and will interfere mechanically with the third lens unit. Further, inconvenience will be produced since the moving direction of the second lens unit will be reversed between the wide position and the tele position, and indefinite at certain intermediate focal lengths.

When the above-mentioned condition (1) is satisfied, the second lens unit can be moved for focusing toward the object side where a sufficient airspace is reserved. In this case, however, aberrations may be varied, especially remarkable in the vicinity of the tele position.

When the second lens unit has a focal length which is extremely short as compared with that of the vari-focal lens system as a whole, spherical aberration and coma will undesirably be varied remarkably. It is desirable for the second lens unit to have a focal length satisfying the following condition (2):

$$0.15 < |f_{II}|/f_T < 0.5 \quad (2)$$

wherein the reference symbol $f_{II}$ represents the focal length of the second lens unit and the reference symbol $f_T$ designates the focal length of the vari-focal lens system as a whole at the tele position.

If the lower limit of the condition (2) is exceeded, spherical aberration and coma will tend to be varied remarkably by focusing. If the upper limit of the condition (2) is exceeded, the imaging magnification of the seocnd lens unit can hardly be kept lower than 1x over the entire vari-focal range, thereby producing a tendency to prolong and enlarge the total length of the vari-focal lens system and the diameter of the first lens unit respectively.

BRIEF DESCRIPTION OF THE DRAWINGS

FIG. 1 through FIG. 4 show sectional views illustrating compositions of Embodiments 1 through 4 of the present invention;

FIG. 5, FIG. 6 and FIG. 7 show graphs illustrating aberration characteristics at the wide position, intermediate focal length and tele position respectively of Embodiment 1 of the present invention when it is focused on an object located at an infinite distance;

FIG. 8, FIG. 9 and FIG. 10 show graphs illustrating aberration characteristics at the wide position, intermediate focal length and tele position respectively of Embodiment 1 when it is focused on an object located at a distance of 1.0 m;

DETAILED DESCRIPTION OF THE PREFERRED EMBODIMENTS

Figure 1:
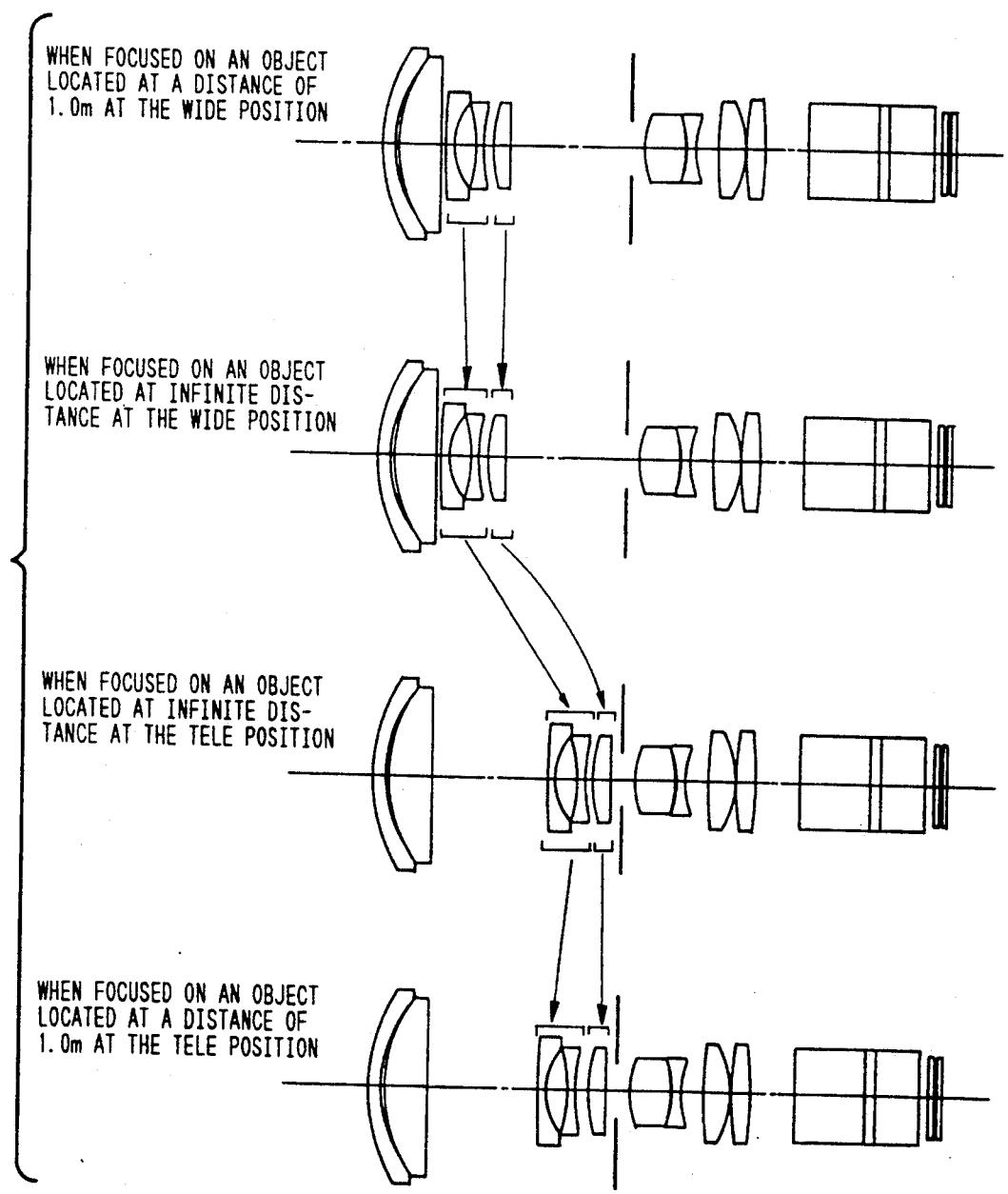

Now, numerical data of the Embodiments 1 through 4 of the present invention will be described below.

Embodiment 1

| $f = 9.263 \sim 26.218, F/2.7$ |||| 
| $2\omega = 48.8° \sim 18.2°$ ||||
| --- | --- | --- | --- |
| $r_1 = 20.6250$ | | | |
| | $d_1 = 1.5000$ | $n_1 = 1.84666$ | $\nu_1 = 23.78$ |
| $r_2 = 15.8200$ | | | |
| | $d_2 = 0.4300$ | | |
| $r_3 = 17.4930$ | | | |
| | $d_3 = 4.8000$ | $n_2 = 1.69680$ | $\nu_2 = 55.52$ |
| $r_4 = \infty$ | | | |
| | $d_4 = D_1$ (variable) | | |
| $r_5 = 119.7480$ | | | |
| | $d_5 = 0.9000$ | $n_3 = 1.69680$ | $\nu_3 = 55.52$ |
| $r_6 = 8.0570$ | | | |
| | $d_6 = 2.4000$ | | |
| $r_7 = -21.0120$ | | | |
| | $d_7 = 0.9000$ | $n_4 = 1.69680$ | $\nu_4 = 55.52$ |
| $r_8 = 25.9270$ | | | |
| | $d_8 = D_2$ (variable) | | |
| $r_9 = 17.3500$ | | | |
| | $d_9 = 2.0000$ | $n_5 = 1.84666$ | $\nu_5 = 23.78$ |
| $r_{10} = \infty$ | | | |
| | $d_{10} = D_3$ (variable) | | |
| $r_{11} = \infty$ (stop) | | | |
| | $d_{11} = 1.5000$ | | |
| $r_{12} = 10.7720$ | | | |
| | $d_{12} = 4.6000$ | $n_6 = 1.74950$ | $\nu_6 = 35.27$ |
| $r_{13} = -16.5440$ | | | |
| | $d_{13} = 0.2100$ | | |
| $r_{14} = -11.3480$ | | | |
| | $d_{14} = 1.0000$ | $n_7 = 1.84666$ | $\nu_7 = 23.78$ |
| $r_{15} = 11.3480$ | | | |

-continued

| | | | |
|---|---|---|---|
| $r_{16} = 43.0900$ | | | |
| | $d_{15} = 2.6200$ | | |
| $r_{17} = -12.1820$ | | | |
| | $d_{16} = 3.2000$ | $n_8 = 1.69680$ | $\nu_8 = 55.52$ |
| $r_{18} = 43.5920$ | | | |
| | $d_{17} = 0.1500$ | | |
| $r_{19} = -56.1520$ | | | |
| | $d_{18} = 2.2000$ | $n_9 = 1.69680$ | $\nu_9 = 55.52$ |
| $r_{20} = \infty$ | | | |
| | $d_{19} = 4.9500$ | | |
| $r_{21} = \infty$ | | | |
| | $d_{20} = 7.9000$ | $n_{10} = 1.51633$ | $\nu_{10} = 64.15$ |
| $r_{22} = \infty$ | | | |
| | $d_{21} = 1.2000$ | $n_{11} = 1.51633$ | $\nu_{11} = 64.15$ |
| $r_{23} = \infty$ | | | |
| | $d_{22} = 5.1000$ | $n_{12} = 1.54771$ | $\nu_{12} = 62.83$ |
| $r_{24} = \infty$ | | | |
| | $d_{23} = 0.9000$ | | |
| $r_{25} = \infty$ | | | |
| | $d_{24} = 0.7000$ | $n_{13} = 1.51633$ | $\nu_{13} = 64.15$ |
| $r_{26} = \infty$ | | | |
| | $d_{25} = 0.3100$ | | |
| $r_{27} = \infty$ | | | |
| | $d_{26} = 0.6000$ | $n_{14} = 1.48749$ | $\nu_{14} = 70.20$ |

| | | | |
|---|---|---|---|
| f | 9.263 | 15.192 | 26.218 |
| $D_1$ | 0.600 | 7.250 | 13.190 |
| $D_2$ | 0.930 | 1.470 | 0.800 |
| $D_3$ | 13.760 | 6.570 | 1.300 |

$D_{1W} = 0.493$, $D_{1T} = 12.564$
$|\beta_{IIT}| = 0.617$, $|f_{II}|/f_T = 0.248$ Embodiment 2

$f = 9.259 \sim 26.147$, F/2.7
$2\omega = 48.8° \sim 18.2°$

| | | | |
|---|---|---|---|
| $r_1 = 58.7060$ | | | |
| | $d_1 = 1.6000$ | $n_1 = 1.84666$ | $\nu_1 = 23.78$ |
| $r_2 = 32.7940$ | | | |
| | $d_2 = 0.0800$ | | |
| $r_3 = 34.0170$ | | | |
| | $d_3 = 3.6000$ | $n_2 = 1.60311$ | $\nu_2 = 60.70$ |
| $r_4 = -296.6310$ | | | |
| | $d_4 = 0.1500$ | | |
| $r_5 = 27.3950$ | | | |
| | $d_5 = 2.9000$ | $n_3 = 1.69680$ | $\nu_3 = 55.52$ |
| $r_6 = 126.2960$ | | | |
| | $d_6 = D_1$ (variable) | | |
| $r_7 = 94.2810$ | | | |
| | $d_7 = 0.9000$ | $n_4 = 1.83400$ | $\nu_4 = 37.16$ |
| $r_8 = 9.3580$ | | | |
| | $d_8 = 2.5000$ | | |
| $r_9 = -13.1840$ | | | |
| | $d_9 = 0.9000$ | $n_5 = 1.74320$ | $\nu_5 = 49.31$ |
| $r_{10} = 13.1840$ | | | |
| | $d_{10} = 2.2000$ | $n_6 = 1.84666$ | $\nu_6 = 23.78$ |
| $r_{11} = -93.3350$ | | | |
| | $d_{11} = D_2$ (variable) | | |
| $r_{12} = 47.8790$ | | | |
| | $d_{12} = 1.6000$ | $n_7 = 1.83400$ | $\nu_7 = 37.16$ |
| $r_{13} = -98.2020$ | | | |
| | $d_{13} = D_3$ (variable) | | |
| $r_{14} = \infty$ (stop) | | | |
| | $d_{14} = 1.6000$ | | |
| $r_{15} = 13.8640$ | | | |
| | $d_{15} = 2.8000$ | $n_8 = 1.70154$ | $\nu_8 = 41.21$ |
| $r_{16} = -68.4970$ | | | |
| | $d_{16} = 0.4600$ | | |
| $r_{17} = -13.7800$ | | | |
| | $d_{17} = 6.0000$ | $n_9 = 1.80518$ | $\nu_9 = 25.43$ |
| $r_{18} = 20.9170$ | | | |
| | $d_{18} = 0.3800$ | | |
| $r_{19} = 54.9350$ | | | |
| | $d_{19} = 2.8000$ | $n_{10} = 1.69680$ | $\nu_{10} = 55.52$ |
| $r_{20} = -14.9350$ | | | |
| | $d_{20} = 0.1500$ | | |
| $r_{21} = 31.2930$ | | | |
| | $d_{21} = 2.5000$ | $n_{11} = 1.69680$ | $\nu_{11} = 55.52$ |
| $r_{22} = -31.2930$ | | | |

-continued

| | | | |
|---|---|---|---|
| | $d_{22} = 13.1500$ | | |
| $r_{23} = \infty$ | | | |
| | $d_{23} = 1.0000$ | $n_{12} = 1.51633$ | $\nu_{12} = 64.15$ |
| $r_{24} = \infty$ | | | |
| | $d_{24} = 4.8000$ | $n_{13} = 1.54771$ | $\nu_{13} = 62.83$ |
| $r_{25} = \infty$ | | | |
| | $d_{25} = 1.0000$ | | |
| $r_{26} = \infty$ | | | |
| | $d_{26} = 0.7000$ | $n_{14} = 1.51633$ | $\nu_{14} = 64.15$ |
| $r_{27} = \infty$ | | | |
| | $d_{27} = 0.3100$ | | |
| $r_{28} = \infty$ | | | |
| | $d_{28} = 0.6000$ | $n_{15} = 1.48749$ | $\nu_{15} = 70.20$ |
| $r_{29} = \infty$ | | | |

| | | | |
|---|---|---|---|
| f | 9.259 | 15.633 | 26.147 |
| $D_1$ | 1.000 | 8.306 | 13.857 |
| $D_2$ | 0.640 | 1.960 | 0.600 |
| $D_3$ | 14.117 | 5.491 | 1.300 |

$D_{1W} = 0.820$, $D_{1T} = 12.274$
$|\beta_{IIT}| = 0.845$, $|f_{II}|/f_T = 0.308$ Embodiment 3

$f = 10.311 \sim 26.211$, F/2.7
$2\omega = 44.4° \sim 18.2°$

| | | | |
|---|---|---|---|
| $r_1 = 23.6800$ | | | |
| | $d_1 = 1.5000$ | $n_1 = 1.84666$ | $\nu_1 = 23.78$ |
| $r_2 = 16.8630$ | | | |
| | $d_2 = 0.2800$ | | |
| $r_3 = 18.1330$ | | | |
| | $d_3 = 4.6000$ | $n_2 = 1.72916$ | $\nu_2 = 54.68$ |
| $r_4 = \infty$ | | | |
| | $d_4 = D_1$ (variable) | | |
| $r_5 = 42.4050$ | | | |
| | $d_5 = 0.9000$ | $n_3 = 1.69680$ | $\nu_3 = 56.49$ |
| $r_6 = 9.1690$ | | | |
| | $d_6 = 2.5900$ | | |
| $r_7 = -14.2020$ | | | |
| | $d_7 = 0.8000$ | $n_4 = 1.61700$ | $\nu_4 = 62.79$ |
| $r_8 = 66.6990$ | | | |
| | $d_8 = D_2$ (variable) | | |
| $r_9 = 27.1360$ | | | |
| | $d_9 = 1.7000$ | $n_5 = 1.84666$ | $\nu_5 = 23.78$ |
| $r_{10} = \infty$ | | | |
| | $d_{10} = D_3$ (variable) | | |
| $r_{11} = \infty$ (stop) | | | |
| | $d_{11} = 1.8000$ | | |
| $r_{12} = 30.3850$ | | | |
| | $d_{12} = 2.1000$ | $n_6 = 1.78470$ | $\nu_6 = 26.22$ |
| $r_{13} = -15.2330$ | | | |
| | $d_{13} = 0.3500$ | | |
| $r_{14} = -8.6190$ | | | |
| | $d_{14} = 4.5500$ | $n_7 = 1.80518$ | $\nu_7 = 25.43$ |
| $r_{15} = 22.8320$ | | | |
| | $d_{15} = 0.0700$ | | |
| $r_{16} = 27.0080$ | | | |
| | $d_{16} = 3.4000$ | $n_8 = 1.61700$ | $\nu_8 = 62.79$ |
| $r_{17} = -10.3220$ | | | |
| | $d_{17} = 0.1500$ | | |
| $r_{18} = 56.5600$ | | | |
| | $d_{18} = 2.1000$ | $n_9 = 1.60311$ | $\nu_9 = 60.70$ |
| $r_{19} = -26.4480$ | | | |
| | $d_{19} = 13.8000$ | | |
| $r_{20} = \infty$ | | | |
| | $d_{20} = 1.6000$ | $n_{10} = 1.51633$ | $\nu_{10} = 64.15$ |
| $r_{21} = \infty$ | | | |
| | $d_{21} = 4.4000$ | $n_{11} = 1.54771$ | $\nu_{11} = 62.83$ |
| $r_{22} = \infty$ | | | |
| | $d_{22} = 0.5000$ | | |
| $r_{23} = \infty$ | | | |
| | $d_{23} = 0.6000$ | $n_{12} = 1.51633$ | $\nu_{12} = 64.15$ |
| $r_{24} = \infty$ | | | |

| | | | |
|---|---|---|---|
| f | 10.311 | 16.425 | 26.211 |
| $D_1$ | 1.010 | 7.690 | 13.200 |
| $D_2$ | 0.820 | 1.760 | 0.800 |
| $D_3$ | 13.170 | 5.550 | 1.000 |

$D_{1W} = 0.805$, $D_{1T} = 11.971$

-continued $|\beta_{IIT}| = 0.747, |f_{II}|/f_T = 0.319$

Embodiment 4

$f = 6.181 \sim 34.916, F/2.06 \sim F/3.21$
$2\omega = 50.2° \sim 9.4°$

| | | | |
|---|---|---|---|
| $r_1 = 27.4156$ | | | |
| | $d_1 = 1.2000$ | $n_1 = 1.84666$ | $\nu_1 = 23.78$ |
| $r_2 = 17.5554$ | | | |
| | $d_2 = 3.7000$ | $n_2 = 1.72916$ | $\nu_2 = 54.68$ |
| $r_3 = 299.8897$ | | | |
| | $d_3 = D_1$ (variable) | | |
| $r_4 = -328.5711$ | | | |
| | $d_4 = 0.8000$ | $n_3 = 1.83400$ | $\nu_3 = 37.16$ |
| $r_5 = -8.7329$ | | | |
| | $d_5 = 1.9800$ | | |
| $r_6 = -11.3687$ | | | |
| | $d_6 = 0.7000$ | $n_4 = 1.72342$ | $\nu_4 = 38.03$ |
| $r_7 = 10.0021$ | | | |
| | $d_7 = 2.8000$ | $n_5 = 1.84666$ | $\nu_5 = 23.78$ |
| $r_8 = -23.3617$ | | | |
| | $d_8 = D_2$ (variable) | | |
| $r_9 = \infty$ (stop) | | | |
| | $d_9 = D_3$ (variable) | | |
| $r_{10} = 23.3201$ | | | |
| | $d_{10} = 2.7000$ | $n_6 = 1.65844$ | $\nu_6 = 50.86$ |
| $r_{11} = -20.0228$ | | | |
| | $d_{11} = 0.1500$ | | |
| $r_{12} = 11.2746$ | | | |
| | $d_{12} = 2.9000$ | $n_7 = 1.58904$ | $\nu_7 = 53.20$ |
| $r_{13} = -167.1643$ | | | |
| | $d_{13} = 0.4600$ | | |
| $r_{14} = -21.8933$ | | | |
| | $d_{14} = 6.0000$ | $n_8 = 1.80518$ | $\nu_8 = 25.43$ |
| $r_{15} = 10.7636$ | | | |
| | $d_{15} = 0.2200$ | | |
| $r_{16} = 14.0734$ | | | |
| | $d_{16} = 2.8000$ | $n_9 = 1.58904$ | $\nu_9 = 53.20$ |
| $r_{17} = -15.8124$ | | | |
| | $d_{17} = D_4$ (variable) | | |
| $r_{18} = 83.1097$ | | | |
| | $d_{18} = 1.0000$ | $n_{10} = 1.80100$ | $\nu_{10} = 34.97$ |
| $r_{19} = 5.7463$ | | | |
| | $d_{19} = 0.3400$ | | |
| $r_{20} = 7.6305$ | | | |
| | $d_{20} = 2.8000$ | $n_{11} = 1.59270$ | $\nu_{11} = 35.29$ |
| $r_{21} = -22.3407$ | | | |
| | $d_{21} = 1.0000$ | | |
| $r_{22} = \infty$ | | | |
| | $d_{22} = 2.0000$ | $n_{12} = 1.51633$ | $\nu_{12} = 64.15$ |
| $r_{23} = \infty$ | | | |
| | $d_{23} = 1.0000$ | | |
| $r_{24} = \infty$ | | | |
| | $d_{24} = 0.6000$ | $n_{13} = 1.51633$ | $\nu_{13} = 64.15$ |
| $r_{25} = \infty$ | | | |

| f | 6.181 | 14.527 | 34.916 |
|---|---|---|---|
| $D_1$ | 1.100 | 12.039 | 18.359 |
| $D_2$ | 18.259 | 7.320 | 1.000 |
| $D_3$ | 8.307 | 5.967 | 1.509 |
| $D_4$ | 1.000 | 3.340 | 7.798 |

$D_{1W} = 0.895, D_{1T} = 17.087$
$|\beta_{IIT}| = 0.679, |f_{II}|/f_T = 0.275$ wherein the reference symbols $r_1$, $r_2$, . . . represent the radii of curvature on the surfaces of the respective lens elements, the reference symbols $d_1$, $d_2$, . . . designate the thicknesses of the respective lens elements and the airspaces reserved therebetween, the reference symbols $n_1$, $n_2$, . . . designate the refractive indices of the respective lens elemnts, and the reference symbols $\nu_1$, $\nu_2$, . . . denote the Abbe's numbers of the respective lens elements.

Embodiments 1 through 3 are designed as the vari-focal lens systems having the compositions illustrated in FIG. 1 through FIG. 3 respectively.

The rear focusing method is adopted not only for using a light-weight focusing lens unit advantageous for autofocusing and reducing the number of the lens elements required for composing the vari-focal lens system but also for reducing the diameter of the first lens unit. That is to say, the rear focusing method is adopted for eliminating the necessity to move the first lens unit toward the object side for preventing the offaxial rays from being vignetted. When the rear focusing method is selected, it is therefore desirable to adopt a composition which allows to use a first lens unit having a small diameter.

In order to use such a first lens unit having a small diameter in a zoom lens system, it is necessary to locate the entrance pupil close to the object side surface of the zoom lens system. For this purpose, it is necessary for the zoom lens system to reduce the number of the lens elements arranged on the object side of the aperture stop, reduce thickness of each of the lens elements and narrow the airspace required for moving the movable lens units.

As an example of the conventional zoom lens system which comprises four lens units and satisfies the above-mentioned requirement, there is known the zoom lens system in which the second lens unit is divided into a lens unit consisting of two negative lens components and another lens unit consisting of a positive lens component, these two lens units are moved in the same direction, while varying the airspace reserved therebetween, for varying focal length of the zoom lens system and correcting the variation of image surface caused by the variation of focal length, and the compensator is omitted. That is to say, this zoom lens system comprises, in the order from the object side, a first lens unit having a positive refractive power, a second lens unit consisting of the two negative lens components, a third positive lens unit and a fourth positive lens unit, and is adapted so as to perform zooming by moving the second lens unit and the third lens unit in the same direction while varying the airspace reserved between these lens units.

Each of the Embodiments 1 through 3 of the present invention is designed as a vari-focal lens system which has the composition similar to that of the zoom lens system described above. The vari-focal lens system having such a composition comprises a second lens unit which has imaging magnifications lower than 1x over the entire vari-focal range, and can be focused, over the entire vari-focal range thereof, on an object located at a short distance by moving the second lens unit toward the object side, or is compatible with the rear focusing method. It is unnecessary for each of these embodiments to reserve a surplus airspace for focusing since a sufficient airspace is reserved on the object side of the second lens unit at the tele position. At the wide position of each of these embodiments, on the other hand, the first lens unit and the second lens unit are close to each other, but the moving distance of the second lens unit for focusing is very short and a wide airspace need not be reserved in the vari-focal lens system. Further, close-up in the vicinity of the wide position can easily be carried out by moving the third lens unit, which is one of the lens units movable for zooming, toward the image side. Furthermore, each of vari-focal lens systems preferred as the Embodiments 1 through 3 may be focused, only in the vicinity of the wide position, by moving the third lens unit toward the image side.

Figure 4:
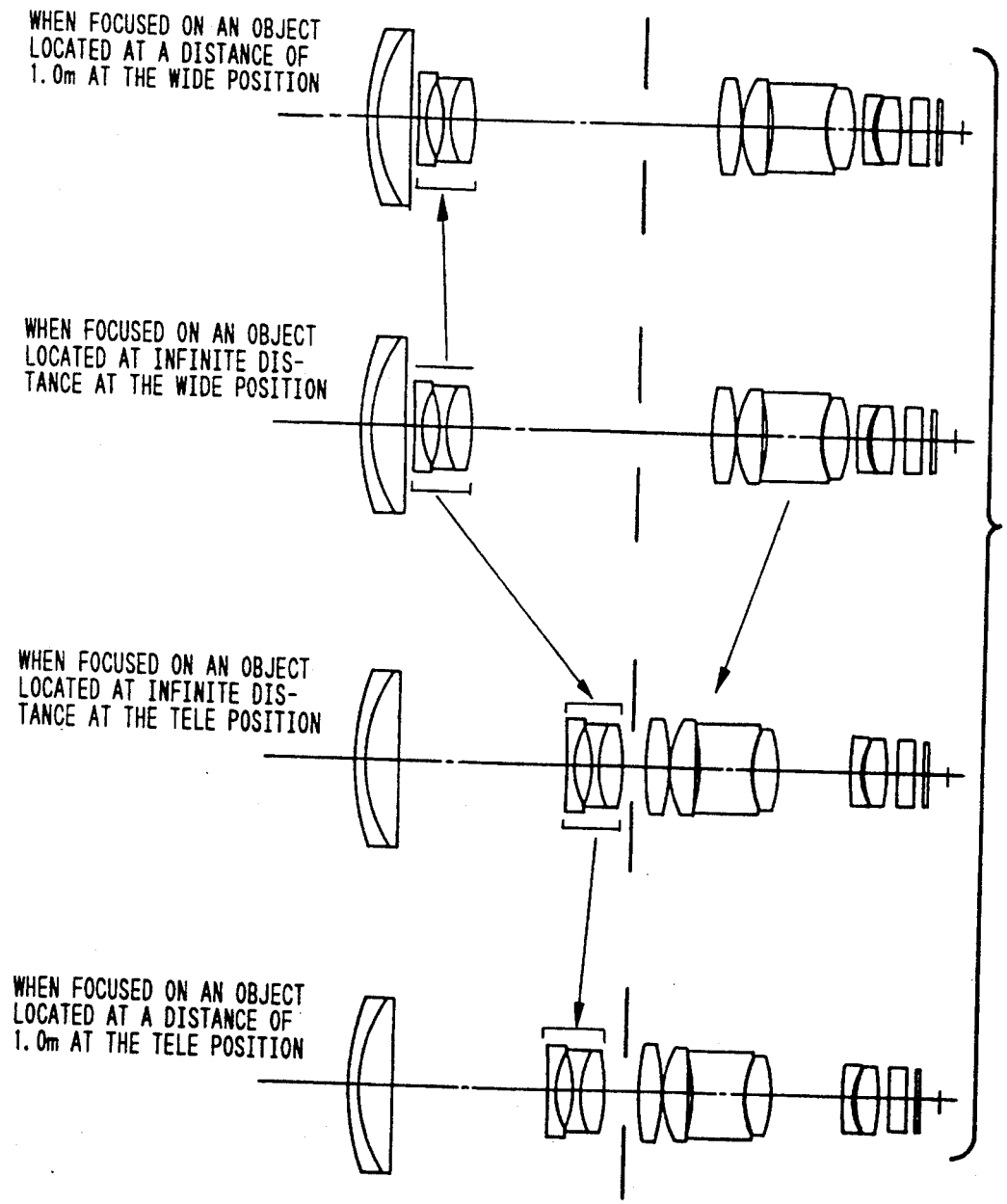
Figure 5:
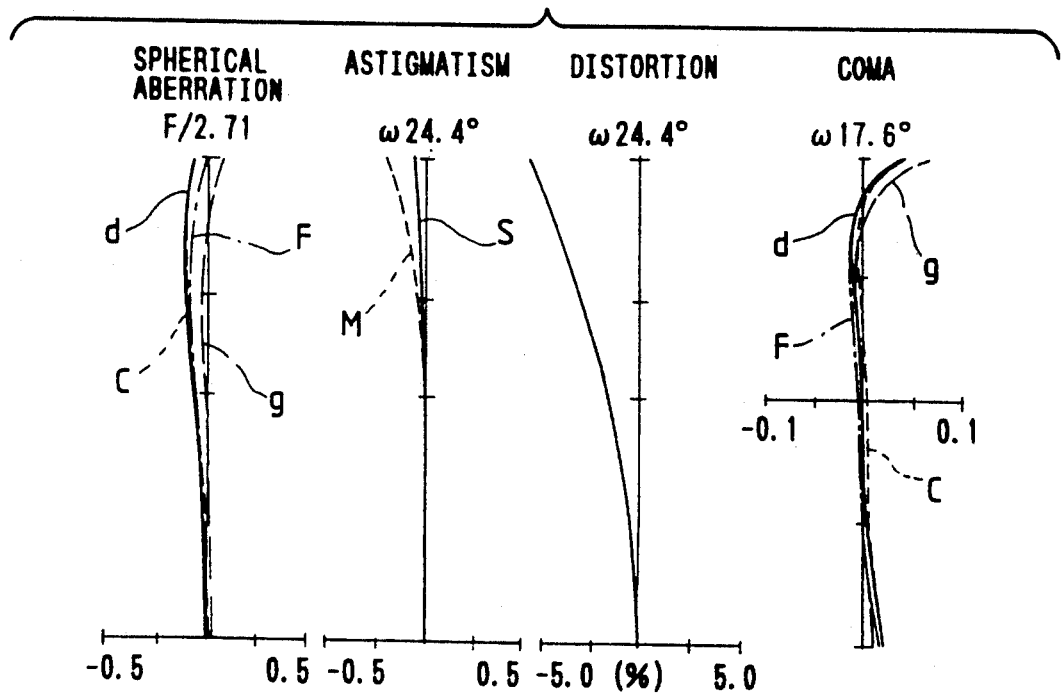
Figure 6:
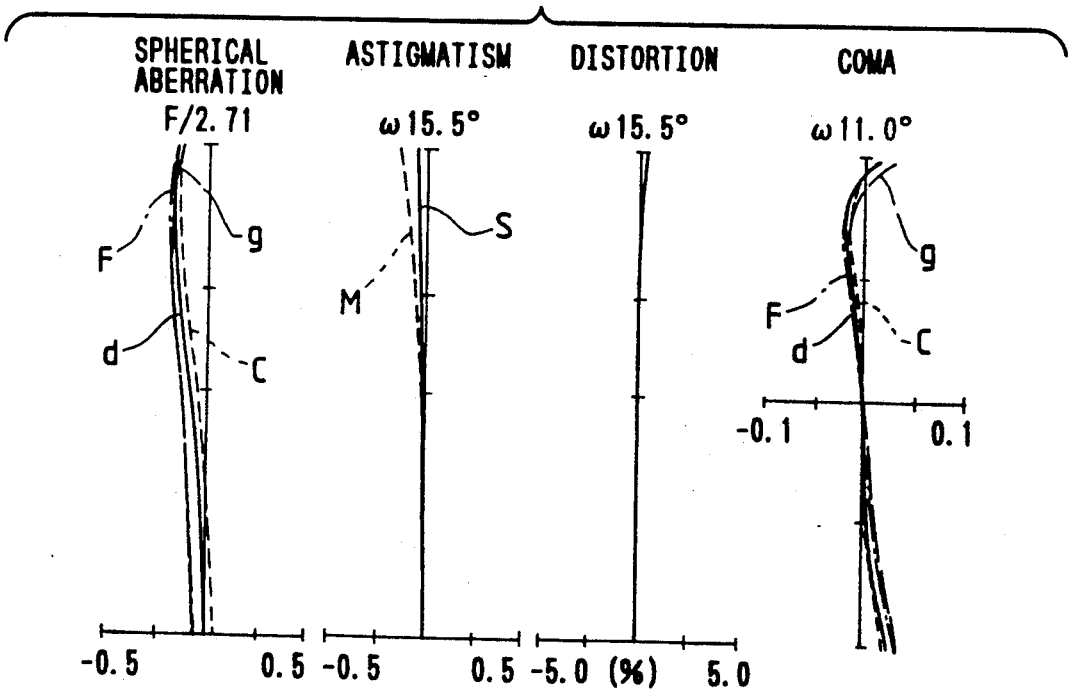
Figure 9:
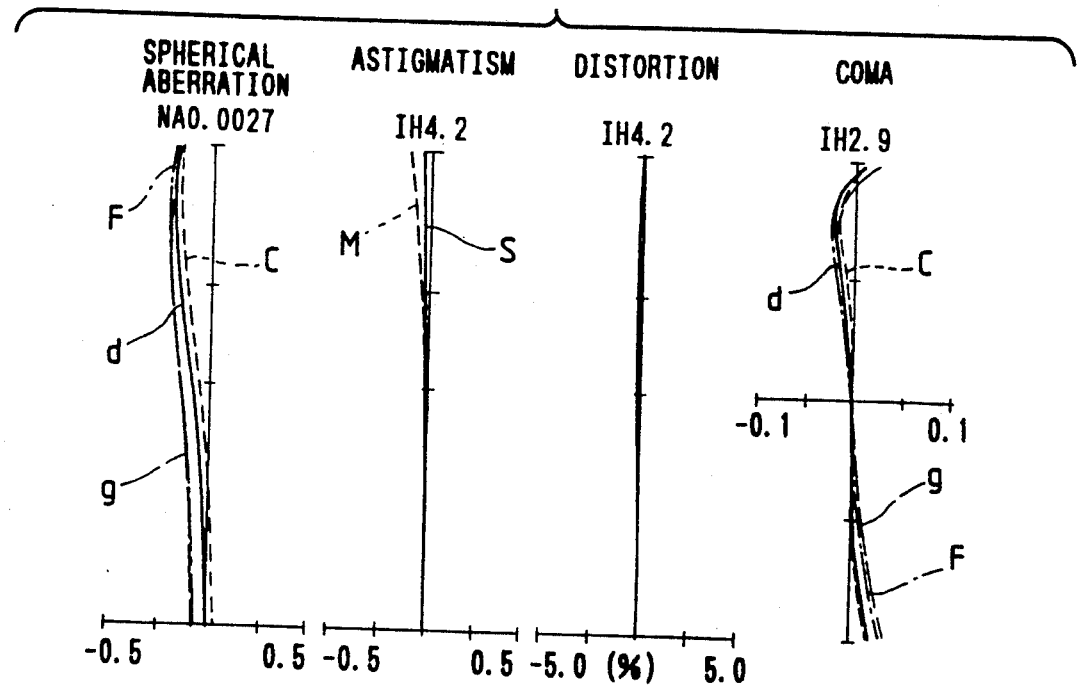
Figure 10:
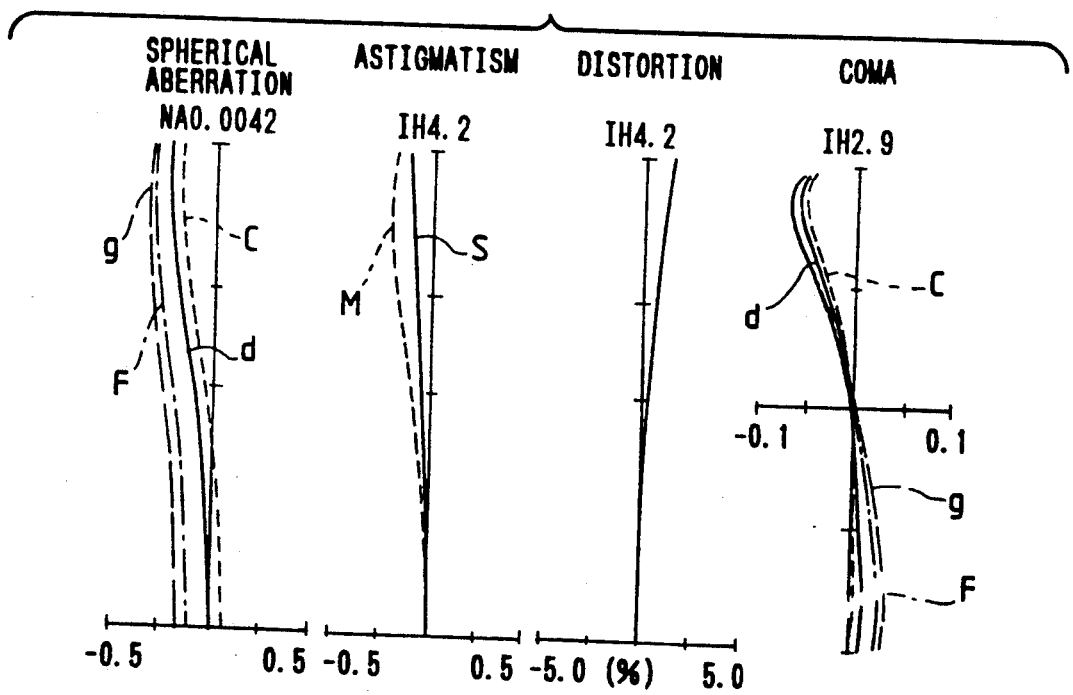
Figure 11:
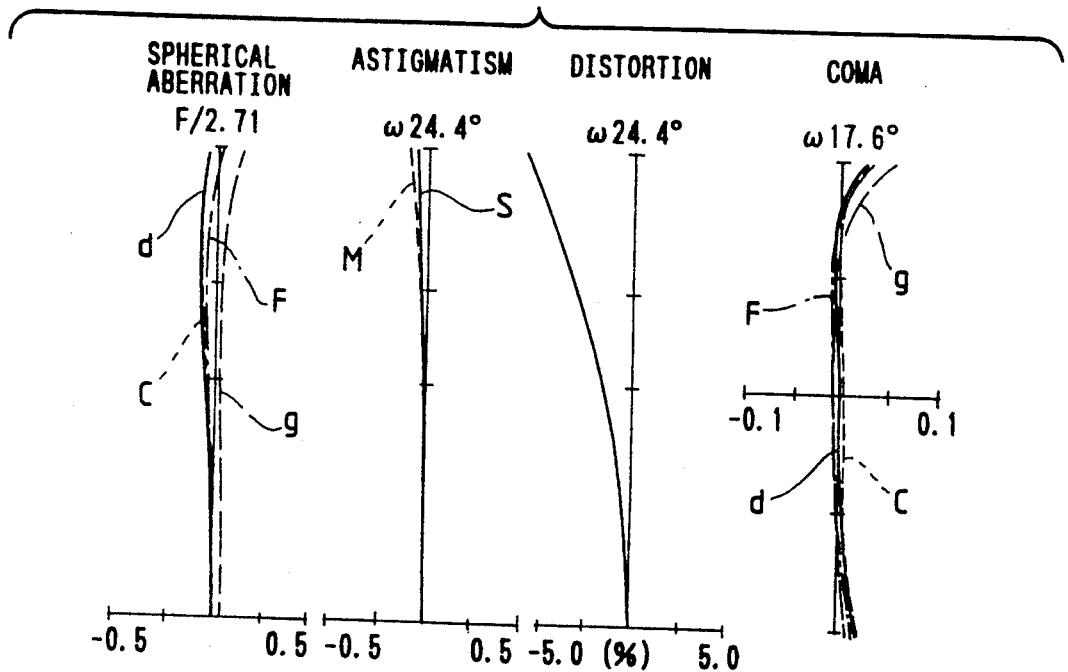
FIG. 11, FIG. 12 and FIG. 13 show curves illustrating aberration characteristics at the wide position, intermediate focal length and tele position respectively of Embodiment 2 of the present invention when it is focused on an object located at an infinite distance.
Figure 12:
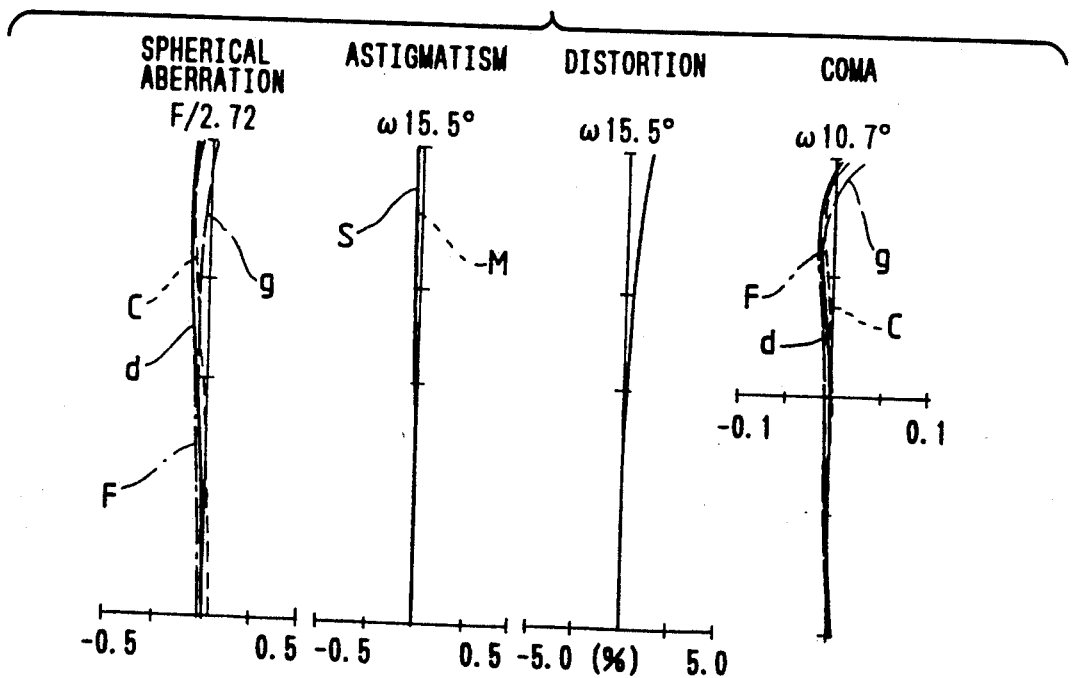
Figure 13:
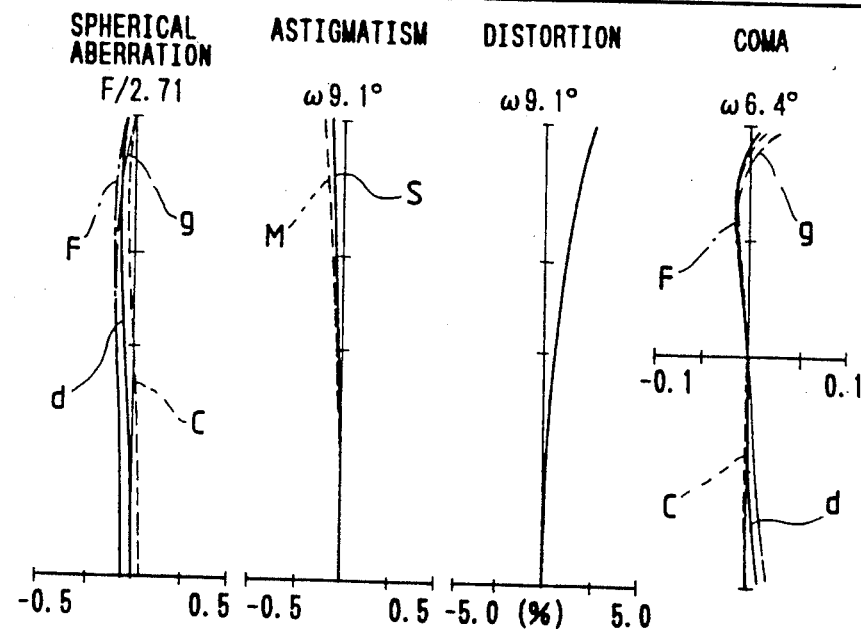
Figure 14:
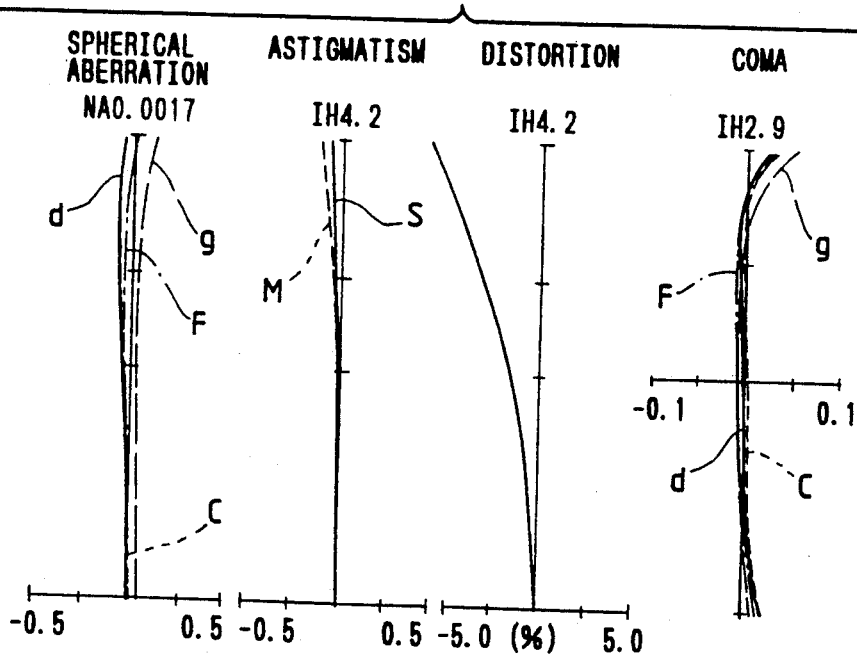
FIG. 14, FIG. 15 and FIG. 16 show curves illustrating aberration characteristics at the wide position, intermediate focal length and tele position respectively of Embodiment 2 when it is focused on an object located at a distance of 1.0 m.
Figure 15:
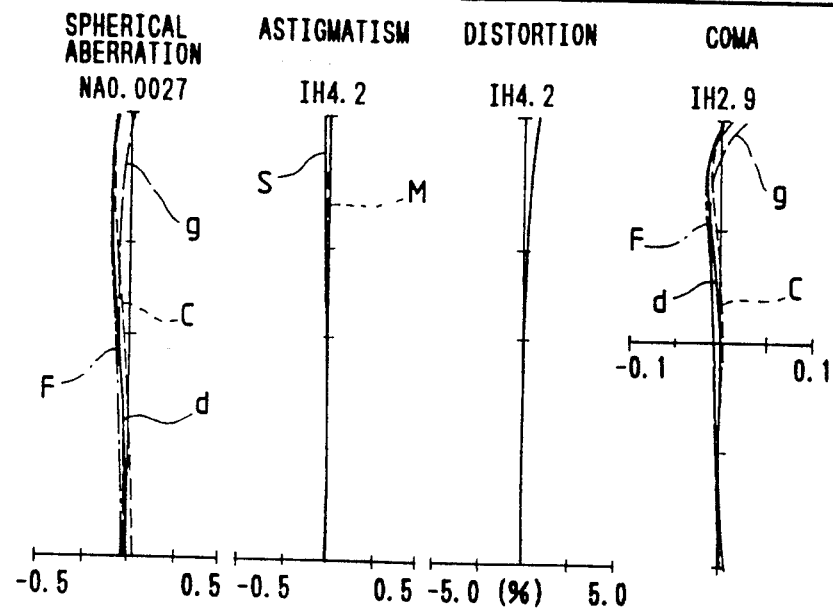
Figure 16:
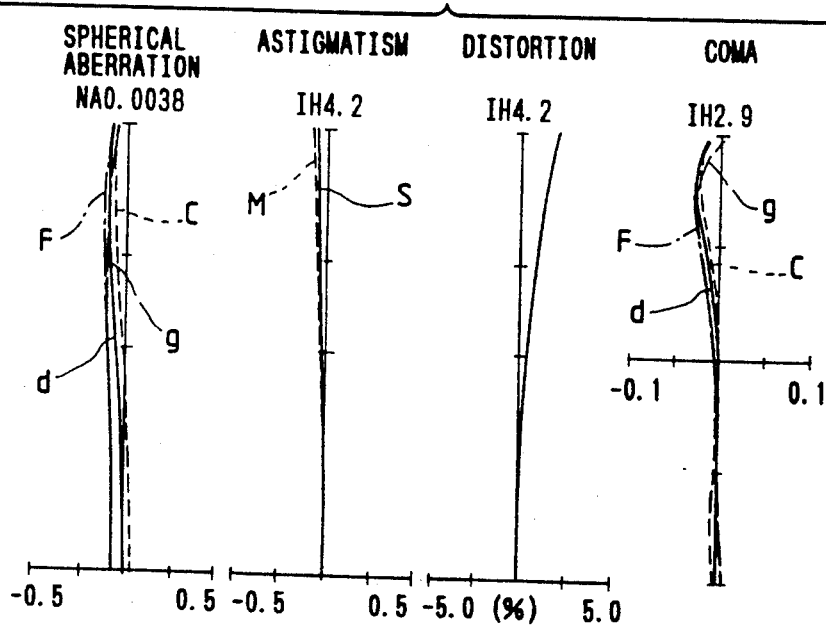
Figure 17:
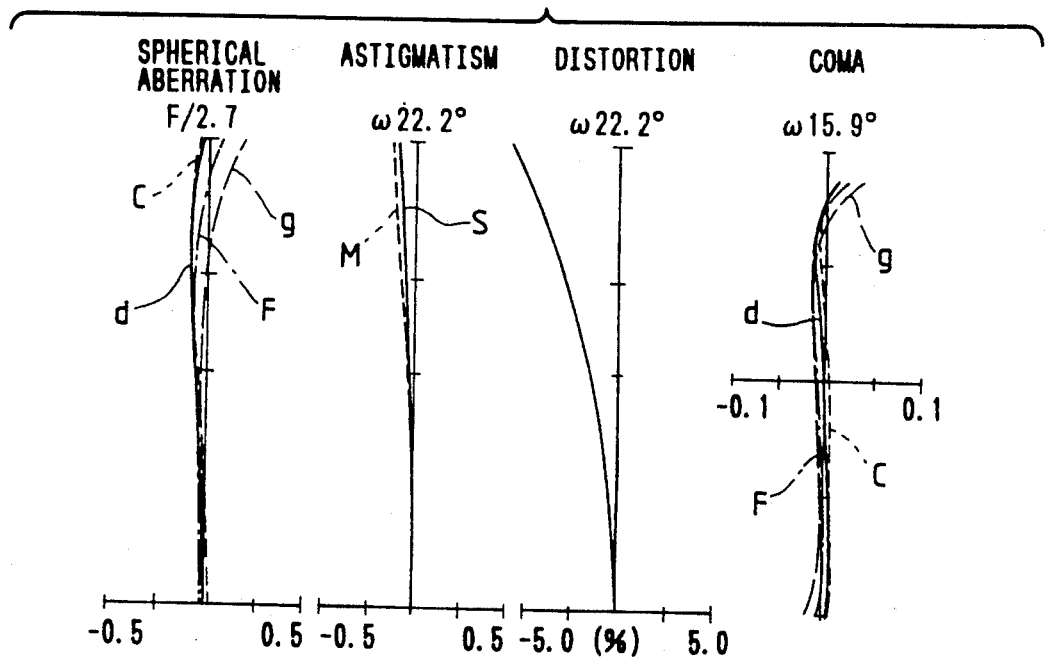
FIG. 17, FIG. 18 and FIG. 19 show graphs visualizing aberration characteristics at the wide position, intermediate focal length and tele position respectively of Embodiment 3 of the present invention when it is focused on an object located at infinite distance.
Figure 18:
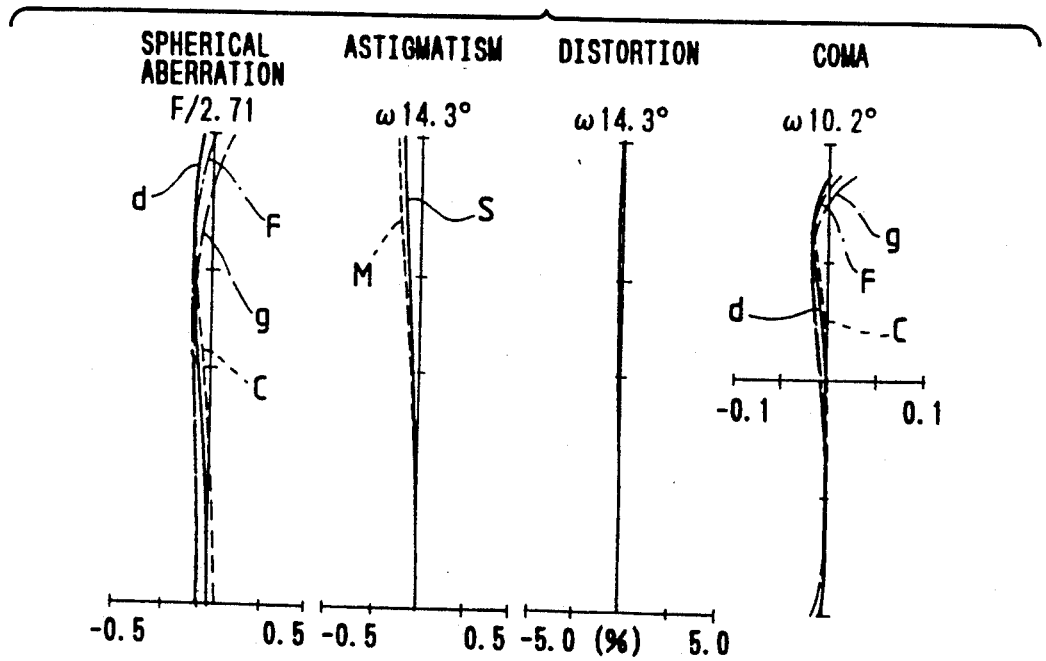
Figure 19:
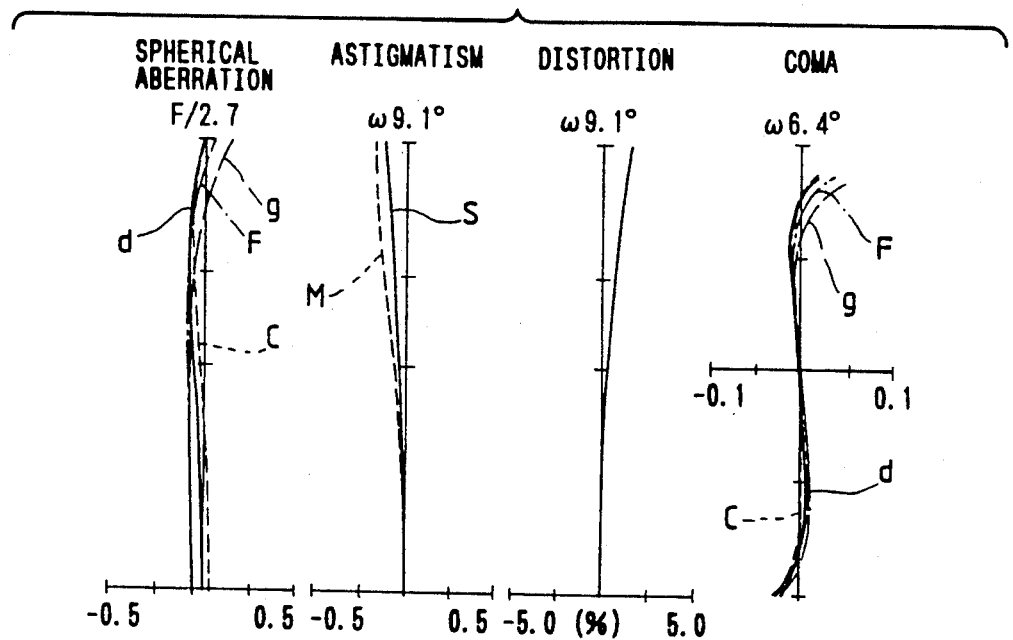
Figure 20:
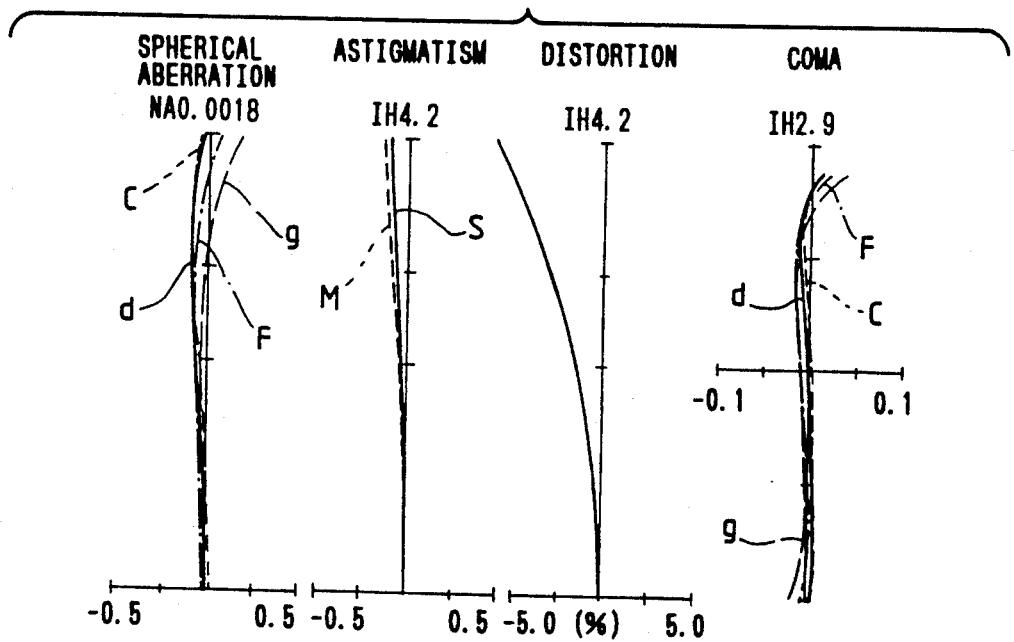
FIG. 20, FIG. 21 and FIG. 22 show curves visualizing aberration characteristics at the wide position, intermediate focal length and tele position respectively of Embodiment 3 when it is focused on an object located at a distance of 1.0 m.
Figure 21:
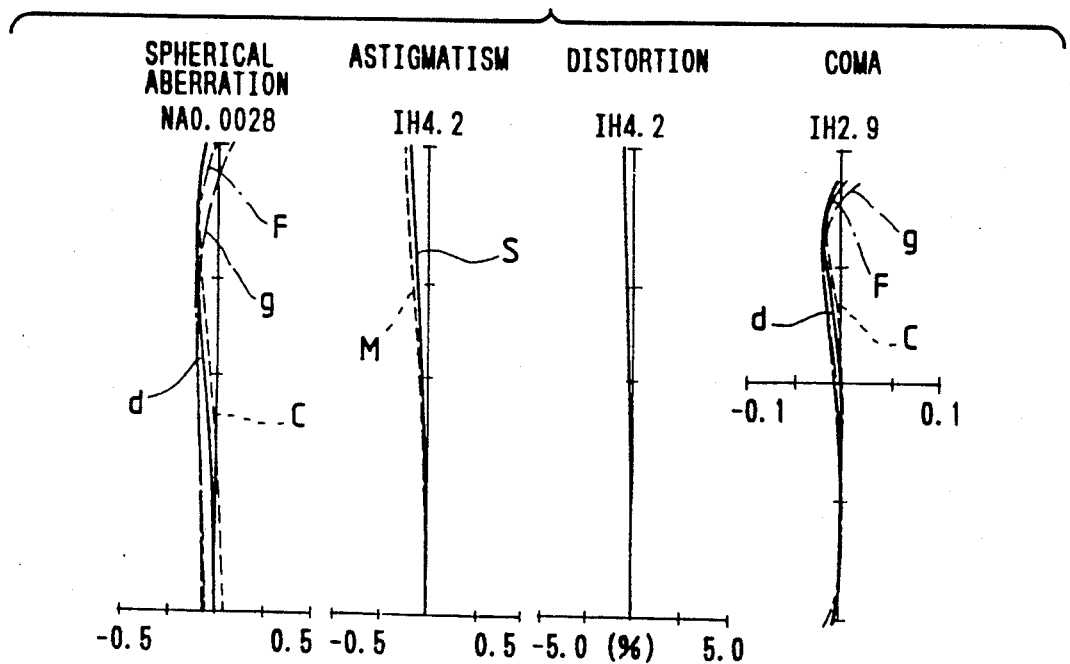
Figure 22:
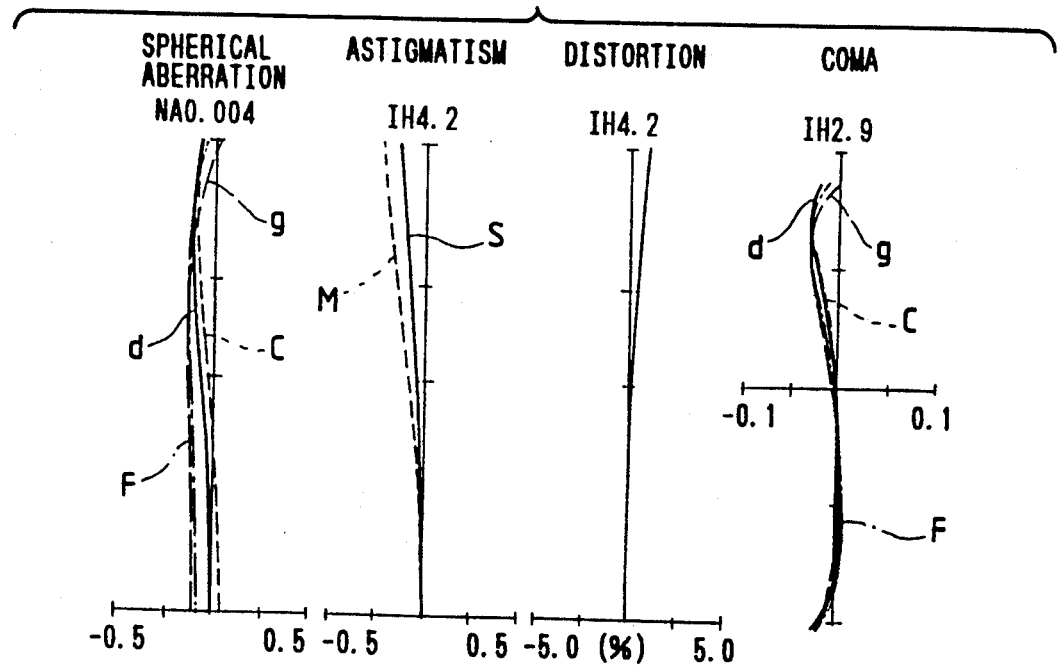
Figure 23:
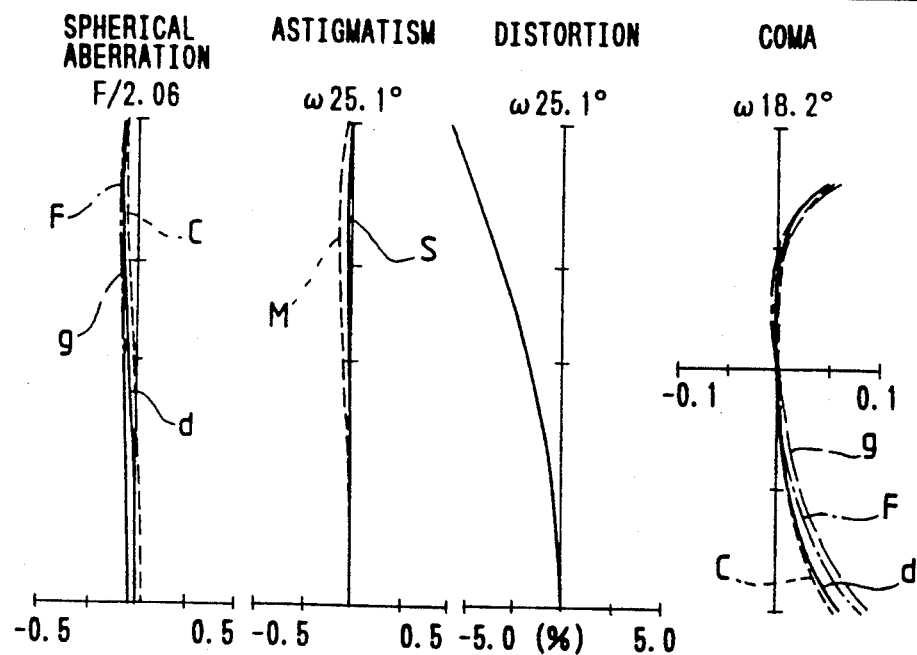
FIG. 23, FIG. 24 and FIG. 25 show graphs visualizing aberration characteristics at the wide position, intermediate focal length and tele position respectively of Embodiment 4 of the present invention when it is focused on an object located at an infinite distance.
Figure 24:
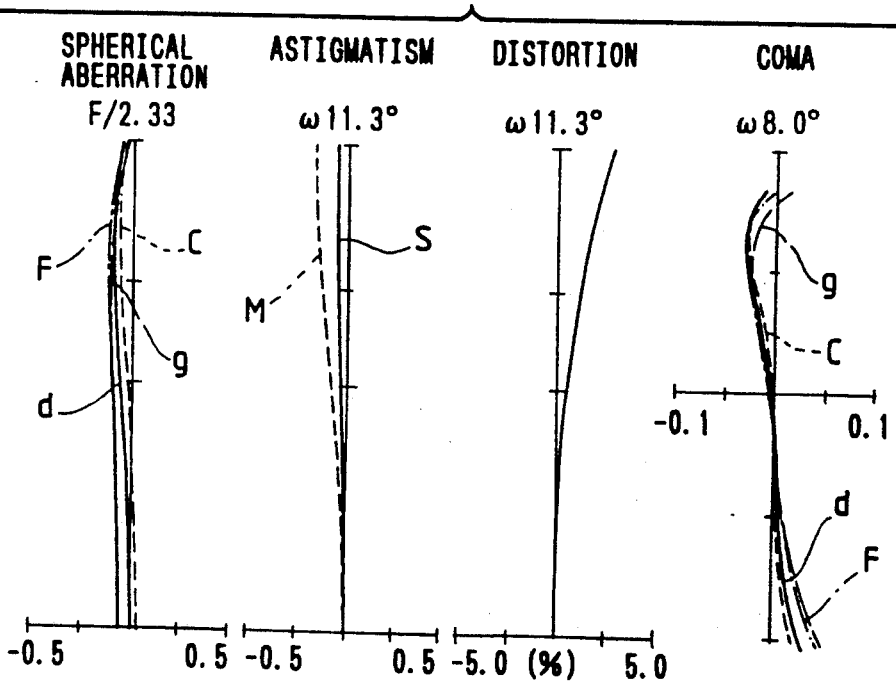
Figure 25:
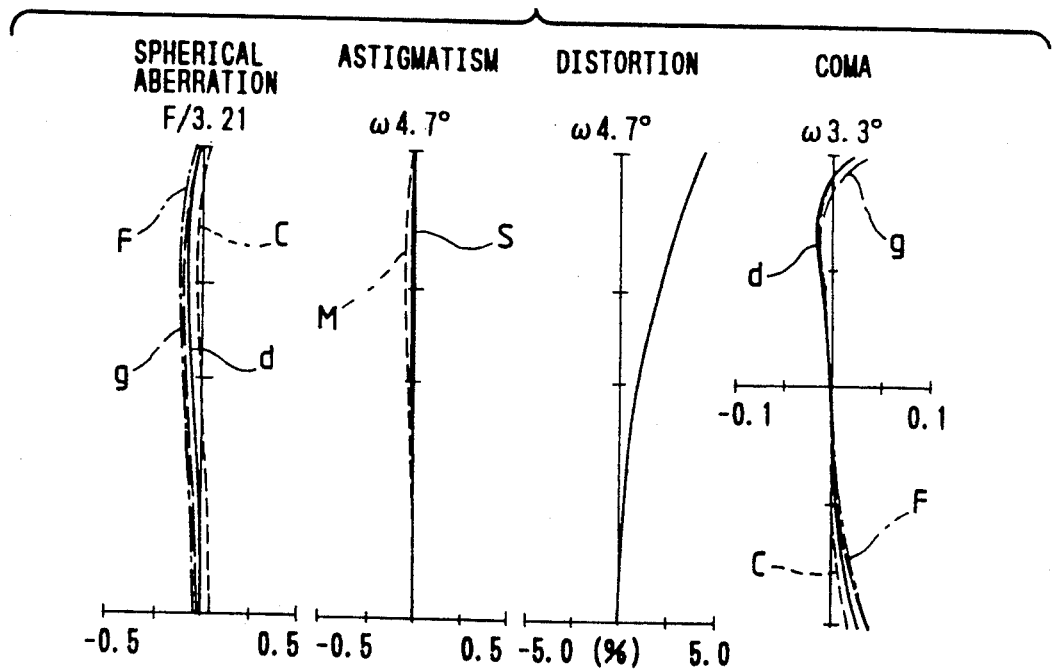
Figure 26:
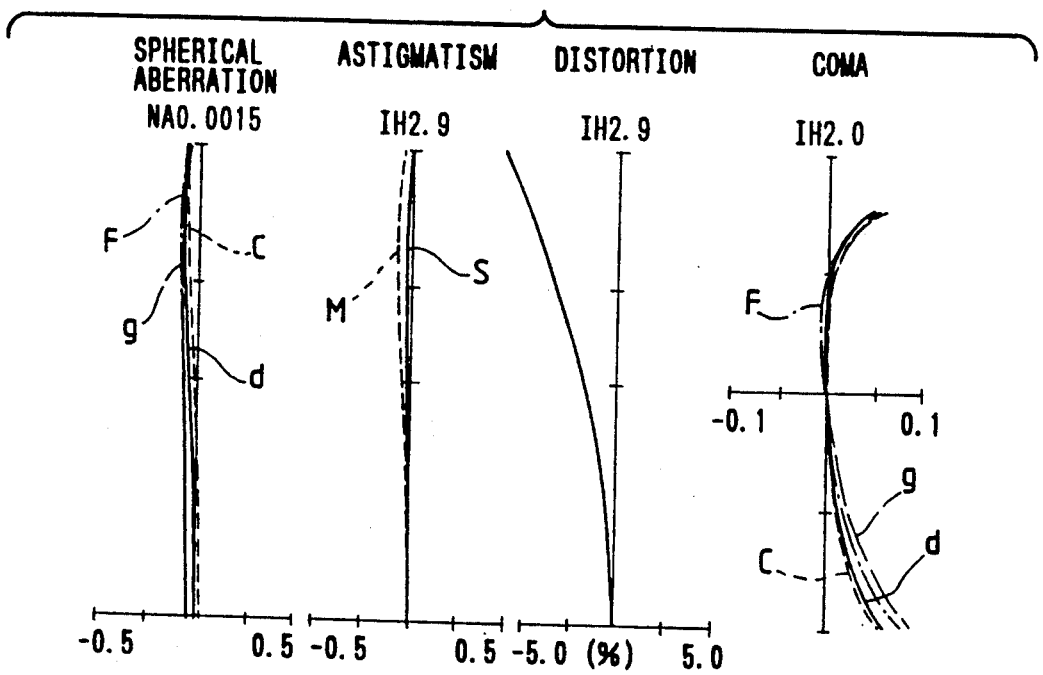
FIG. 26, FIG. 27 and FIG. 28 show curves illustrating aberration characteristics at the wide position, intermediate focal length and tele position respectively of Embodiment 4 of the present invention when it is focused on an object located at a distance of 1.0 m.
Figure 27:
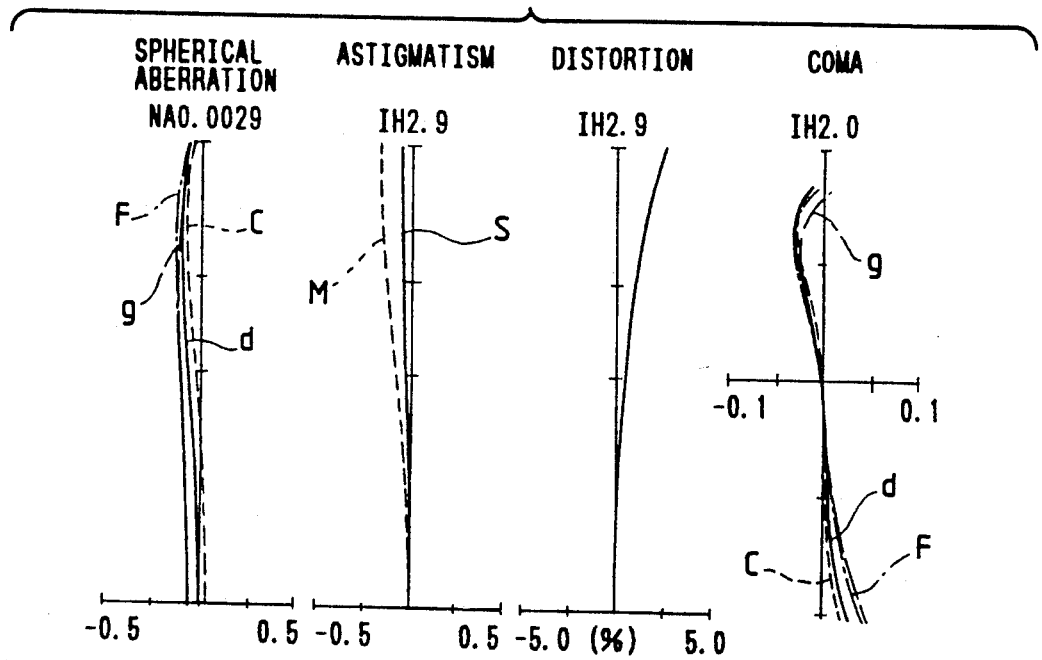
Figure 28:
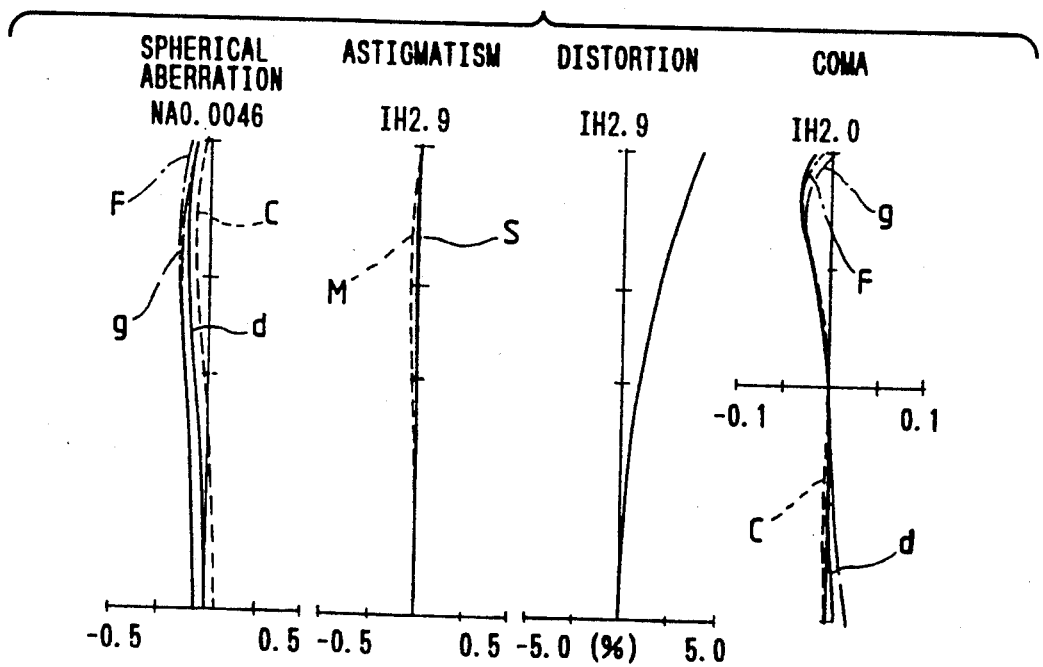

Embodiment 4 of the present invention has the composition shown in FIG. 4, wherein the vari-focal lens system comprises, in the order from the object side, a first lens unit having a positive refractive power, a second lens unit which has a negative refractive power and is movable for variation of focal length of the vari-focal lens system, a third lens unit which has a positive refractive power and is movable for variation of focal length of the vari-focal lens system, and a fourth lens unit.

Embodiment 4 uses the third lens unit which has imaging magnifications lower than 1x over the entire vari-focal range and is moved for zooming in the direction opposite to the moving direction of the second lens unit. Though the second lens unit and the third lens unit are closest to each other at the tele position, it is possible, by arranging an aperture stop between these lens units, to locate the entrance pupil close to the object side surface of the vari-focal lens system and reduce the diameter of the first lens unit.

Embodiment 4 also uses the second lens unit which has imaging magnifications lower than 1x over the entire vari-focal range and can be focused by moving the second lens unit toward the objectsside, or is compatible with the rear focusing method. Further, it is unnecessary for Embodiment 4 to reserve a surplus airspace for focusing since a sufficient airspace is reserved between the first lens unit and the second lens unit at the tele position at which the second lens unit is to be moved for a long distance for focusing. At the wide position at which the first lens unit and the second lens unit are close to each other, on the other hand, the second lens unit is moved only for a short distance for focusing, thereby eliminating the necessity to reserve a wide airspace for focusing in Embodiment 4. Furthermore, Embodiment 4 allows close-up focusing to be carried out easily by moving the third lens unit, which is one of the lens units movable for zooming, toward the object side. Moreover, Embodiment 4 may be focused, only in the vicinity of the wide position, by moving the third lens unit toward the image side.

I claim:

1. A vari-focal lens system comprising, in the order from the object side:
   a first lens unit having a positive refractive power,
   a second lens unit having a negative refractive power,
   a third lens unit having a positive refractive power, and
   a fourth lens unit,
   wherein said vari-focal lens system performs variation of focal length by moving said second lens unit and said third lens unit along the optical axis, and
   wherein said vari-focal lens system performs focusing on an object located at a short distance by moving said second lens unit toward the object side, and
   wherein said first lens unit does not move for focusing or zooming,
   said second lens unit satisfying the following condition (1):

$$|\beta_{IIT}| < 0.95 \qquad (1)$$

wherein the reference symbol $\beta_{IIT}$ represents the magnification of said second lens unit when said vari-focal lens system is focused on an object located at an infinite distance at the tele position thereof.

2. A vari-focal lens system according to claim 1 wherein said second lens unit satisfies the following condition (2):

$$0.15 < |f_{II}|/f_T < 0.5 \qquad (2)$$

wherein the reference symbol $f_{II}$ represents the focal length of the second lens unit and the reference symbol $f_T$ designates the focal length of the vari-focal lens system as a whole at the tele position.

3. A vari-focal lens system according to claim 2 adapted to be focused at the wide position by moving the third lens unit toward the image side.

4. A vari-focal lens system according to claim 1 wherein said third lens unit has magnifications lower than 1x.

* * * * *